Figures 1, 2, 3, 4, 5, 6:
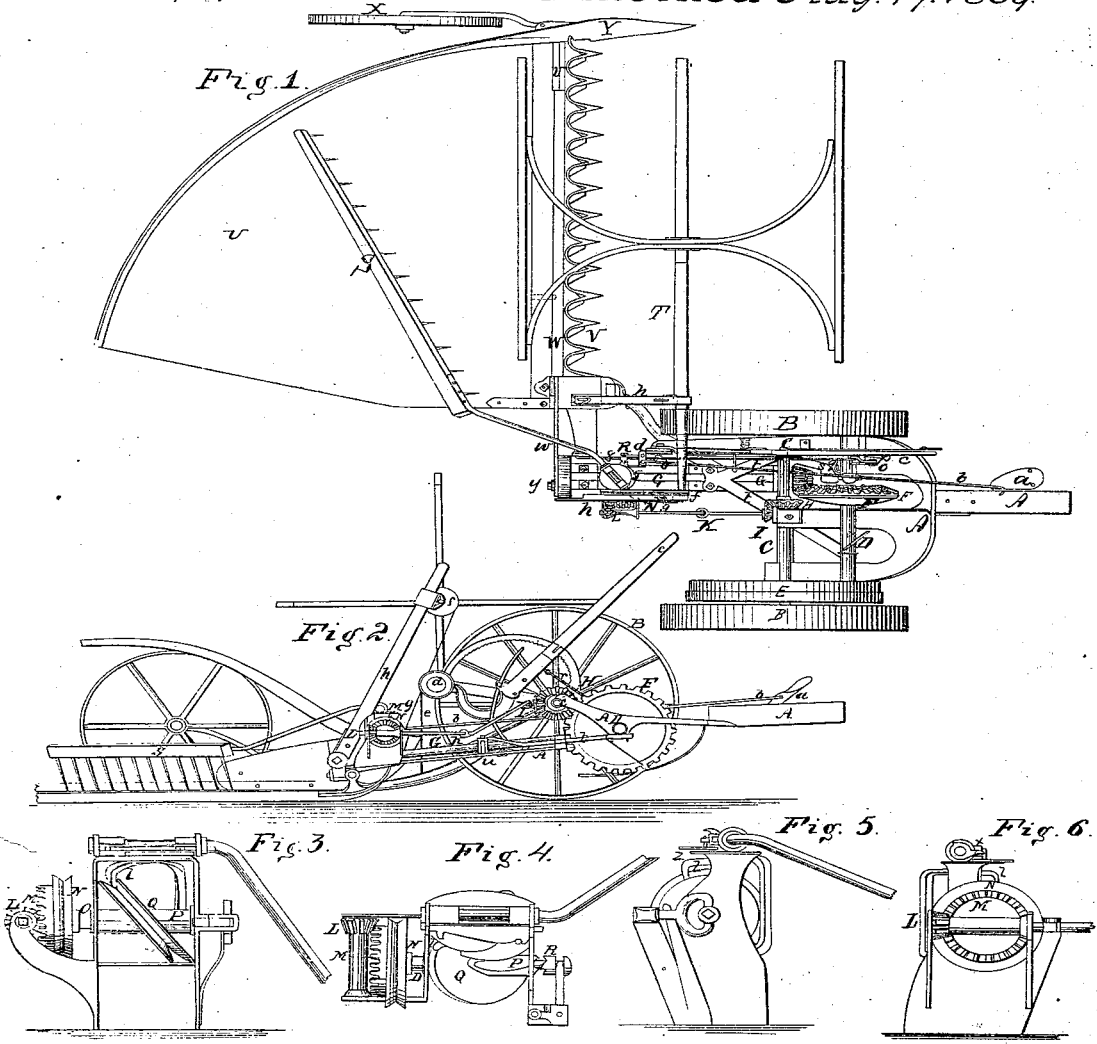

L. Swenson.
Harvester Rake.
No. 93765. Patented Aug. 17, 1869.

Witnesses
J. B. Smith
H. C. Koch

Inventor
Lorens Swenson

L. Swenson.
Harvester Rake.
N° 93765. Patented Aug. 17. 1869.
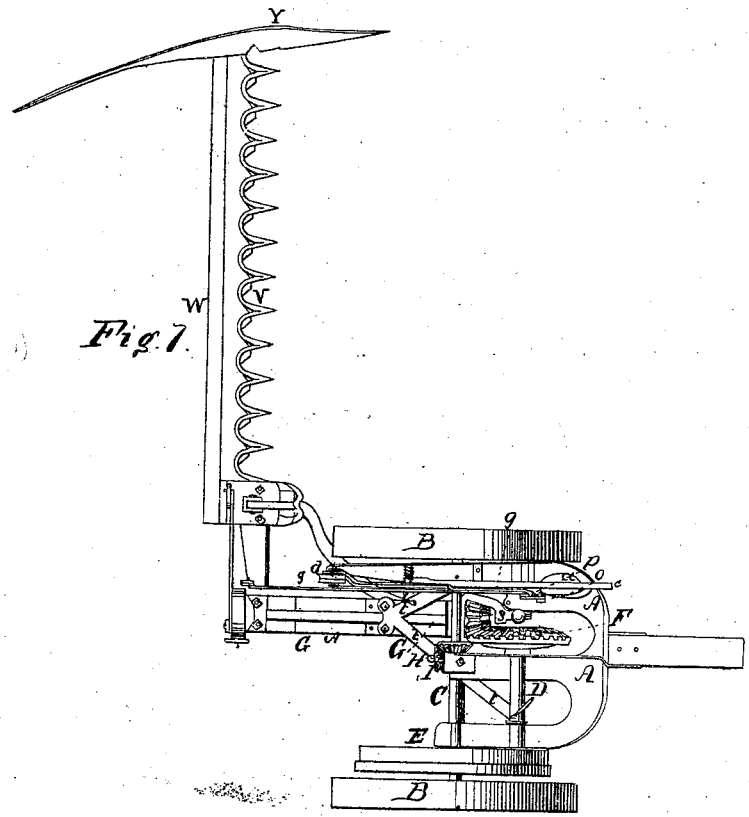
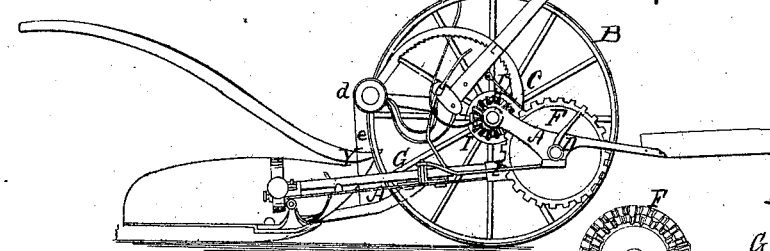
Witnesses
J. B. Smith
H. C. Koch
Inventor.
Lorenson Swenson

UNITED STATES PATENT OFFICE.

LORENS SWENSON, OF NORTH CAPE, WISCONSIN.

IMPROVEMENT IN HARVESTERS.

Specification forming part of Letters Patent No. 93,765, dated August 17, 1869.

*To all whom it may concern:*

Be it known that I, LORENS SWENSON, of North Cape, in the county of Racine and State of Wisconsin, have invented a new and useful Improvement in Reapers and Mowers; and I do hereby declare that the following is a full, clear, and exact description thereof, which will enable those skilled in the art to make and use the same, reference being had to the accompanying drawing, forming part of this specification, in which—

Figure 1 is a top view; Fig. 2, sectional view; Fig. 3, side view of rake-and-reel gear; Fig. 4, top view of rake-and-reel gear; Fig. 5, section of rake and shifting apparatus; Fig. 6, section of reel-and-rake gear; Fig. 7, mower, the reaping machinery removed; Fig. 8, sectional view of mower; Fig. 9, inside view of main driving-wheel; Fig. 10, compound operating gear; Fig. 11, inside view of reaper-wheel hub; Fig. 12, section of main shaft and pinion.

Similar letters of reference in each of the figures indicate corresponding parts.

The object of my invention is to construct a machine for reaping grain and mowing grass, which shall be easily changed from one purpose to the other; and also to have the machine so under the control of the operator that its work shall be done with great facility and perfection; and also that the operator may make it pass over stumps, stones, and other obstructions without stopping and without inconvenience.

A, main frame; B, reaper-wheels; C, axle; D, main driving-shaft; E, main driving-wheel; F, compound bevel-wheel. This wheel is made with a double set of cogs, which makes it equivalent to a wheel with ordinary cogs twice as fine, and prevents the backlashing jerk in ordinary wheels. G, compound pinion and shaft; H, bevel-wheel on axle C; I, bevel-pinion; K, jointed shaft; L, pinion; M, bevel-wheel to operate rake and reel; N, band-wheel; O, reel and rake driving shaft; P, hollow shaft; Q, cam-wheel to operate rake; R, clutch on shaft O; S, rake; T, reel; U, platform; V, guards or sickle-fingers; W, sickle; X, grain-wheel; Y, divider; Z, seat for driver; *a*, foot-shoe with which to ship and unship the rake by means of clutch R; *b*, rod for shipping and unshipping the rake; *c*, lever with which to raise and lower the platform and sickle; *d*, pulley for raising and lowering the platform; *e*, platform-hoisting rope; *f*, pulley on reel-shaft; *g*, band with which to operate reel; *h*, reel-posts; *j*, cogs or teeth in hubs of wheels B; *k*, dogs on axle C, catching into teeth *j*, so that when the wheels move forward the axle turns with them; but when the wheels are moved back they turn on the axle. These dogs *k* are held against the teeth by springs. *l*, crane with which the rake is operated; *m*, compound pinion on shaft D; *n*, compound cogs inside of wheel E, into which mesh cogs of pinion *m*; *o*, post to which is attached apparatus to regulate the cut of the sickle close or distant from the ground, as may be desired; *p*, swing-bar, its upper end attached to the top of post *o*; *q*, rod, with one end attached to swinging bar *p*, and the other to a post on the sickle-frame; *r*, rod from lever *c* to the lower end of swinging bar *p*, which, when lever *c* is moved, pulls or pushes on the sickle-frame by means of rod *q*, bringing the sickle nearer to or farther from the ground, as may be desired; *s*, swivel-joint, which permits the back part of frame A to be raised, lowered, or turned without rocking the frame; *t*, braces to stiffen frame A; *u*, joint or eye through which passes shaft G; *w*, pitman which operates the sickle; *x*, lug on the end of the rake-handle; *y*, crank which operates the sickle; *z*, plate on top of the frame which supports the crane and under the rake-handle.

Operation.

The reaper being in order and properly adjusted for reaping, the team is hitched to it in the ordinary manner, and started, wheels B and grain-wheel X supporting the machine. As wheels B revolve, they turn axle C and wheel E. Cogs *n*, meshing into pinion *m*, revolve main shaft D, with its compound pinion F meshing into pinion G, revolving it with its shaft, which operates sickle W, by means of a crank on the end of shaft G, to which a pitman is attached, connected with the sickle, shaft C, revolving wheel H, meshing into pinion I, revolving jointed shaft K, with pinion L, meshing into bevel-wheel M, turning pulley N, which operates reel T by means of band *g* passing around pulley F.

The rake is put in motion by the operator pressing his foot on shoe *a*, which, by rod *b*, ships clutch R. This revolves shaft P and cam-wheel Q, and as it revolves the point of crane *l*, working in the groove of wheel Q and lug *x* on plate *z*, gives the rake the proper motion for removing the grain from the platform, as desired.

The operator, with his foot on shoe *a*, operates the rake when necessary, and lets it stand still when not required to be in use.

When the machine is to be used as a mower, remove reel T, rake S, platform U, grain-wheel X, rod *b*, swinging bar *p*, rod *r*, shaft K, pinion L, wheel M, wheel N, shaft O, shaft and wheel Q, and crane *l*. Then move shoe *a* to post *o* and attach rod *q* to it, and the reaper becomes a mower, as shown, Fig. 7, and is operated the same as the reaper, the hay falling back of the sickle on the ground.

In passing over stones, stumps, or other obstructions, the driver raises the sickle by lever *e*. This is done the same either when using the machine as a reaper or mower.

When one wheel passes over a stone or any other obstruction, causing it to rise higher than the other wheel, the sickle maintains its position unchanged, the joints *s*, *t*, and *u* making the frame A flexible enough for this purpose; and, when used as a mower, the sickle may be raised to a vertical position, and be operated in that way as well as when located horizontally.

The sickle-guards or fingers V come together at the root, forming a half-circle for the grain or grass to come against to prevent clogging.

What I claim as my invention, and desire to secure by Letters Patent, is—

1. Axle C, wheel H, pinion I, jointed shaft K, pinions L and M, shaft O, pulley N, pulley *f*, band *g*, and reel T, arranged substantially as described.

2. Axle C, wheel H, pinion I, jointed shaft K, pinions L and M, shaft O, hollow shaft P, cam Q, crane *l*, plate *z*, lug *x*, rake S, clutch R, shoe *a*, and rod *b*, constructed and arranged substantially as described.

3. Lever *c*, pulley *d*, rope *e*, post *o*, rod *q*, swing-bar *p*, and rod *r*, in combination with platform U, arranged as shown and described.

LORENS SWENSON.

Witnesses:
   J. B. SMITH,
   FREDERICK SWENSON.